United States Patent [19]

Kokado

[11] 3,814,855

[45] June 4, 1974

[54] SYNCHRONIZING SIGNAL PRODUCING SYSTEM FOR A TELEVISION DEVICE

[75] Inventor: Naoyuki Kokado, Tokyo, Japan

[73] Assignee: Tokyo Shibaura Electric Co., Ltd., Saivai-ku, Kawasaki-shi, Japan

[22] Filed: Apr. 4, 1973

[21] Appl. No.: 347,692

[30] Foreign Application Priority Data

Mar. 31, 1972 Japan .............................. 47-31713

[52] U.S. Cl. ........................................ 178/69.5 TV

[51] Int. Cl. ........................................ H04n 5/04

[58] Field of Search ................ 178/69.5 TV, 69.5 G

[56] References Cited

UNITED STATES PATENTS 3,588,351 6/1971 Baun ........................ 178/69.5 TV 3,691,297 9/1972 Merrell et al. ............... 178/69.5 TV

*Primary Examiner*—Robert L. Griffin

*Assistant Examiner*—George G. Stellar

*Attorney, Agent, or Firm*—Flynn & Frishauf

[57] ABSTRACT

A synchronizing signal producing system for a television device comprises a first counter for receiving input clock pulses having a frequency of an integral multiple of a horizontal synchronizing signal to generate output pulses having a vertical synchronizing frequency with a larger width than that of the clock pulse; a second counter for counting the clock pulses in synchronization with the arrival of a vertical synchronizing signal from the outside; a comparison pulse generator coupled with the second counter so as to derive a clock pulse counted, by the second counter, at a time corresponding to substantially the center of the width of the output pulse from the first counter; a phase comparator for comparing the phase of the output pulse from the comparison pulse generator with that of the output pulse from the first counter; and an output switching circuit for deriving as a vertical synchronizing output for the television device the output pulse of the first counter when the output pulse from the first counter and that from the comparison pulse generator are evaluated by the comparator to be in phase and the output pulse associated synchronously with the vertical synchronizing signal obtained from the outside through the second counter when they are evaluated by the comparator to be out of phase, whereby the television device can be driven always in substantially synchronized condition not only in a case where the vertical synchronizing signal from the outside is equal in frequency to a standard vertical synchronizing signal, but also in a case where the received vertical synchronizing signal is somewhat different in frequency from the standard vertical synchronizing signal.

5 Claims, 15 Drawing Figures

PATENTED JUN 4 1974 3,814,855

SYNCHRONIZING SIGNAL PRODUCING SYSTEM FOR A TELEVISION DEVICE

This invention relates to a synchronizing signal producing system for a television device and more particularly to an improved synchronizing signal producing system in which a vertical synchronizing signal can be obtained, without using any oscillator, by a count down output of a multistage counter chain to which are supplied input clock pulses having a repetitive frequency of an integral multiple of a horizontal synchronizing pulse.

With a television system in general, an interlaced scanning in which one frame is presented by two field scannings displaced a half line (one half of a horizontal scanning cycle) from each other is effected at the transmitting station, using horizontal and vertical synchronizing signals obtained by the above count-down type counter chain.

With a conventional television receiver, however, it was difficult from the standpoint of cost to adopt a count down system using the above counter chain. The conventional television receiver is so designed that the video signals from a transmitting station are applied through a synchronizing pulse separator to a differentiator and an integrator to separate the horizontal and vertical synchronizing pulses from the received video signals. The horizontal and vertical sychronizing signals at the receiver are obtained through injection-lock of respective horizontal and vertical synchronizing signal oscillators by the separated horizontal and vertical synchronizing pulses.

With a television receiver using such an injection lock system for vertical synchronization (an integrator is usually used to separate the vertical synchronizing pulses from the received video signals), however, its vertical synchronization is caused to be undesirably disturbed, under the environment of a weak electric field and intense noises (hereinafter referred to generally as an environment of a lower S/N ratio), due to its poor noise cancellation characteristic, resulting in an incomplete interlaced scanning. Furthermore, a vertical flow of images on the viewing screen is observed not only under the environment of the lower S/N ratio, but also at a channel switching time or at the time of switching TV cameras at the studio and there are often encountered the necessity for a vertical synchronization to be adjusted by a vertical synchronization adjusting knob. Even if the adjusting knob is adjusted, there is a case where no vertical synchronization is obtained dependent upon the state of received signals with the result that a vertical flow of images on the viewing screen is not stopped.

Since a differentiator is used to separate the horizontal synchronizing pulses from the received video signals and the separated horizontal synchronizing signals are ordinarily subjected to an automatic frequency control, a horizontal synchronization is hardly disturbed.

A recent marked development of an IC technique makes it possible to adopt a synchronizing signal producing system using the above count-down type counter chain in which a vertical-synchronizing signal oscillator and vertical synchronization adjusting mechanism are unnecessary even in a television receiver. Already developed are several television receivers in which are incorporated a synchronizing signal producing IC circuitry utilizing the above count-down type counter chain.

All the heretofore proposed synchronizing signal producing circuitries for a television receiver using the count-down type counter chain are so designed to provide, as the horizontal scanning output for the receiver, only an output signal from the counter chain derived in synchronization with vertical synchronizing signals from the outside while being always compared in phase with said vertical synchronizing pulse, said output signal being broader in pulse width than said incoming vertical synchronizing signals. However, the prior art synchronizing signal producing circuitries constructed as mentioned above using the count-down counter chain had the drawback that though they were put to practical use in a standard synchronizing system such as a type for reception of standard television waves in which the frequencies of the horizontal and vertical synchronizing signals substantially satisfied a predetermined relationship (At present, two kinds of 15,750 Hz : 60 Hz = 525 : 2 and 18,750 Hz : 60 Hz = 625 : 2 are mainly used in an international television system, but this specification details the former alone), yet they were not applicable in a simple synchronization system, e.g. other video instruments such as ITV camera, EVR and colour bar generator in which the vertical synchronizing frequency is considerably deviated in the neighbourhood of 60 Hz because the vertical synchronization was markedly disturbed.

This means that even at the reception of the standard television wave the vertical synchronization is markedly disturbed particularly under the environment of the lower signal to noise ratio, and the vertical synchronizing signal disappears resulting in only a single horizontal line being displayed on the viewing screen.

Accordingly, an object of this invention is to provide a synchronizing signal producing system for a television device using a count down type counter chain, which can omit the necessity of using a vertical synchronizing signal oscillator and vertical synchronization adjusting mechanism and is capable of not only improving an interlaced scanning function, but also being put sufficiently to practical use either when a vertical synchronizing frequency is somewhat deviated, or even under the environment of the lower signal to noise ratio.

A synchronizing signal producing system according to this invention comprises a first counter for receiving clock pulses having a frequency of an integral multiple of a horizontal synchronizing signal to generate output pulses having a vertical synchronizing frequency with a larger pulse width than that of the clock pulse; a second counter for counting the clock pulses in synchronism with the arrival of a vertical synchronizing signal from the outside; a comparison pulse generator coupled to the second counter so as to derive a clock pulse counted, by the second counter, at a time corresponding to substantially the center of the width of the output pulse from the first counter; a phase comparator for comparing the phase of the output pulse from the comparison pulse generator with that of the output pulse from the first counter; an output switching circuit for deriving as a vertical synchronizing output the output pulse of the first counter when the output pulse of the first counter and the output pulse of the comparison pulse generator are evaluated by the comparator to be in phase, and the output pulse synchronized with the vertical synchronizing signal obtained from the outside through the second counter when they are evaluated by the comparator to be out of phase.

The television device using such synchronizing signal producing system can improve an interlaced scanning function; obviate the necessity of using a vertical synchronizing signal oscillator and vertical synchronization adjusting mechanism; and be put to practical use even under the environment of the lower signal to noise ratio, as well as when a vertical synchronizing signal from the outside is equal in frequency to, or has a frequency somewhat different from, a standard synchronizing signal.

According to this invention there is further provided a third counter adapted to count several count outputs from the first counter and be broughted into the reset position by the out-of-phase output of the phase comparator, and, only when no output is derived from this counter, the output switching circuit is operative to produce the vertical synchronizing output in synchronism with the vertical synchronizing signal from the outside. With such an arrangement it is advantageously possible to prevent any erraneous operation due to a temporary noise input.

The present invention can be more fully understood from the following detailed description when taken in connection with the accompanying drawings, in which.

There will now be explained in detail a synchronizing signal producing system for a television system embodying this invention by reference to the accompanying drawings.

Figure 1:
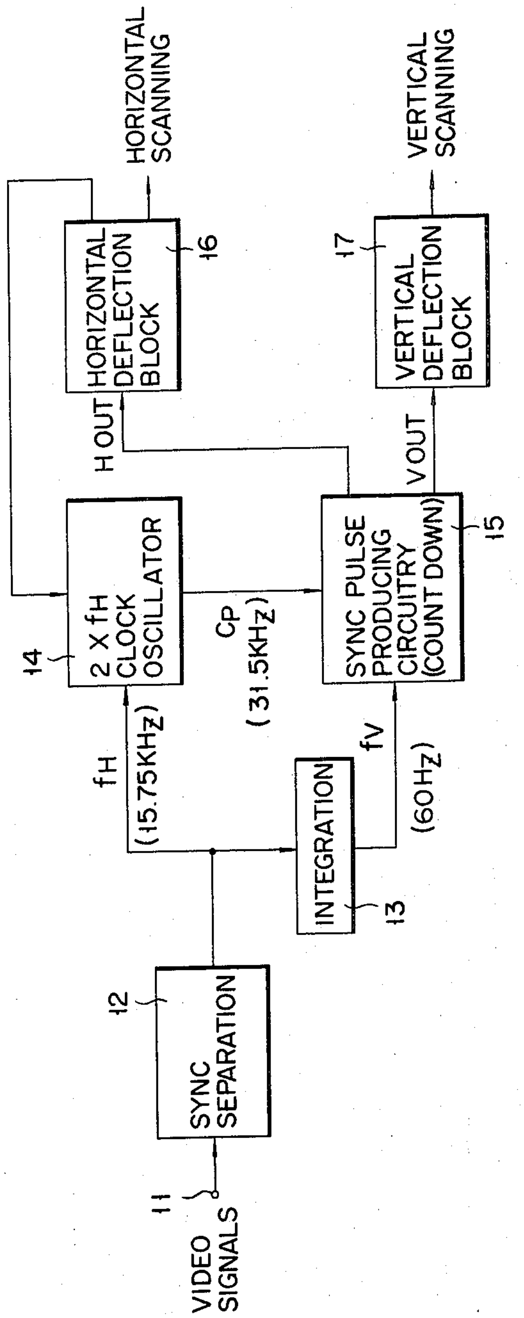
FIG. 1 shows a schematic block diagram of a television receiver including a synchronizing signal producing circuitry according to this invention.

FIG. 1 is a schematic block diagram of a television receiver including a synchronizing signal producing circuitry according to this invention. To a terminal 11 a video signal received by the receiver is applied. The video signal is supplied to a synchronizing signal separator 12 to separate synchronizing signal components included therein, for example, a horizontal synchronizing signal fH of 15,750 Hz and a vertical synchronizing signal *f*V of 60 Hz. The vertical synchronizing signal component *f*V thus obtained is detected at an integrator 13. The horizontal synchronizing signal component *f*H is applied as a clock or phase comparing signal to a clock oscillator for generating clock pulses *Cp* having a frequency of an integral multiple of the horizontal synchronizing signal, for example 31.5 KHz i.e. two times the horizontal synchronizing signal (when time of one horizontal line is $H \approx 63.5\ \mu S$, then a pulse width is about 0.25 H). The clock pulses *Cp* of 31.5 KHz, together with the vertical synchronizing signal *f*V detected by the integrator 13, are fed to a synchronizing signal producing circuitry 15 in accordance with this invention including a count down type counter chain as will later be described. The synchronizing signal producing circuitry 15 generates a horizontal synchronizing output Hout of 15,750 Hz for supply to a horizontal deflection block 16 and a vertical synchronizing output Vout of about 60 Hz for supply to a vertical deflection block 17 while being always compared in phase with the vertical synchronizing signal *f*V derived through the integrator 13. The output signal of the horizontal deflection block 16 is also supplied as an automatic frequency control signal to the clock oscillator 14.

Figure 2:
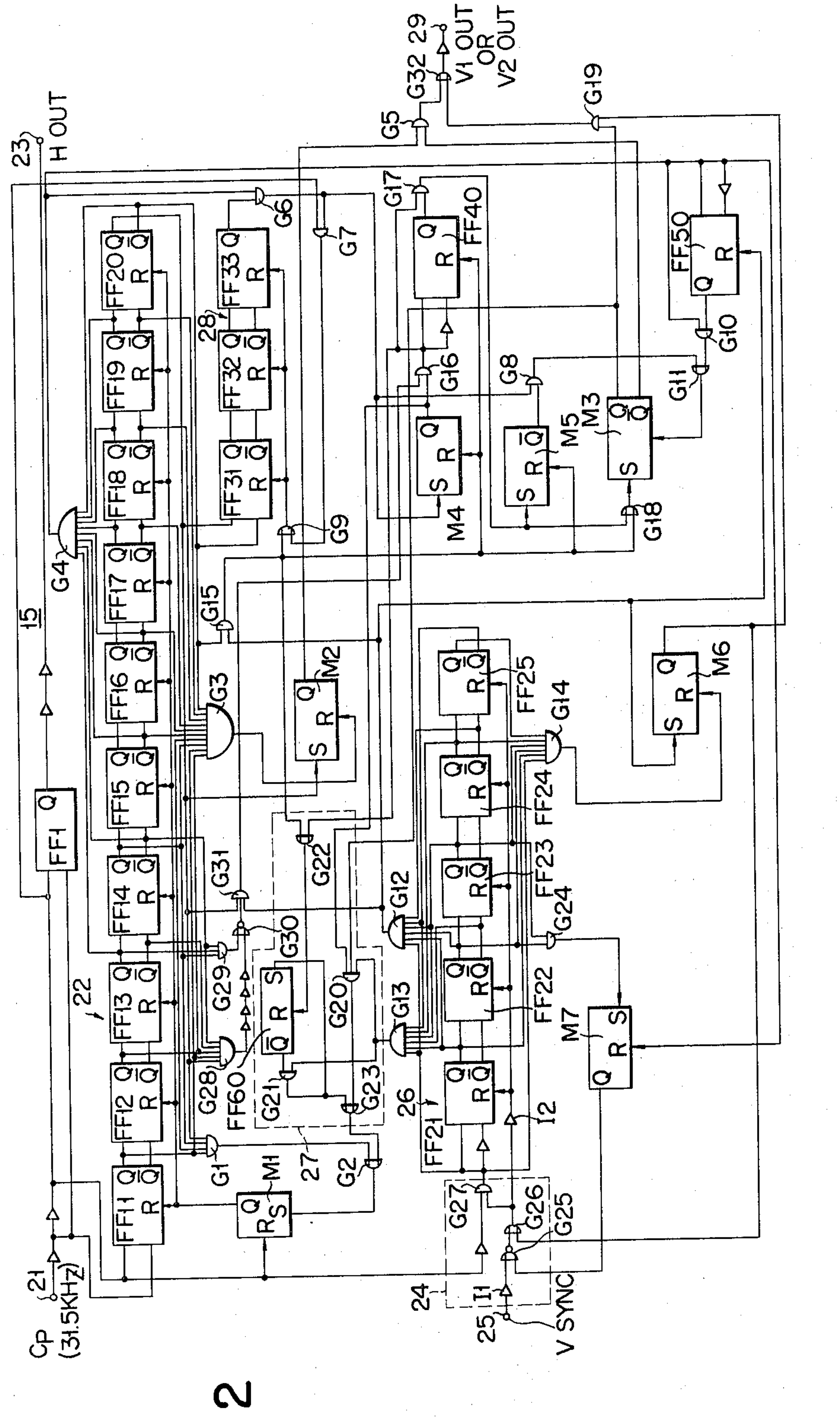
FIG. 2 shows a practical logic circuit arrangement of the synchronizing signal producing circuitry of FIG. 1.
Figures 3A, 3B, 3C, 3D, 3E, 3F, 3G, 3H, 3I, 3J, 3K, 3L, 3M:
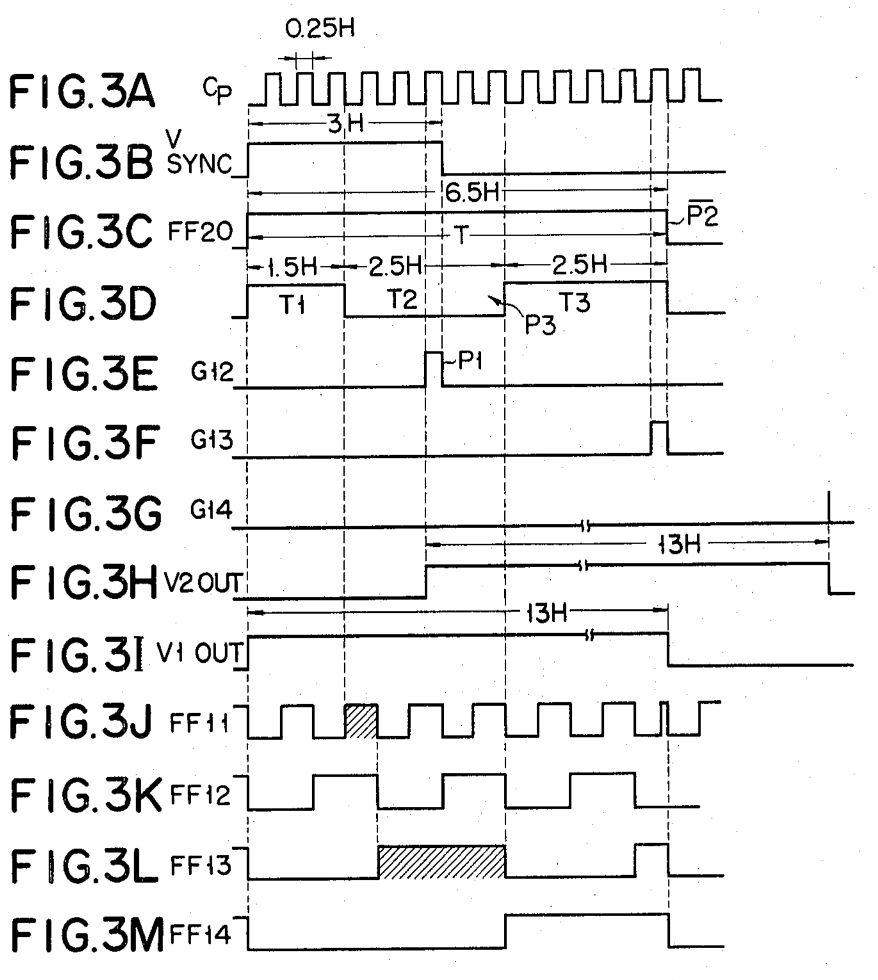
FIGS. 3A and 3M are timing charts showing the waveform of each part of the circuit arrangement of FIG. 2.

FIG. 2 shows a practical logic circuit arrangement of the synchronizing signal producing circuitry 15 according to this invention. The synchronizing signal producing circuitry 15 includes a first multistage frequency dividing counter chain 22 consisting of 10-stage cascade-arranged J-K flip-flops FF11 to FF20 which receive the clock pulses *Cp* of 31.5 KHz applied from the clock pulse oscillator 14 to a terminal 21, a J-K flip-flop FF1 for halving the frequency of the clock pulses *Cp* to produce a horizontal synchronizing output Hout of 15,750 Hz at a terminal 23, and a second counter chain 26 consisting of 5-state cascade-arranged J–K flip-flops FF21 to FF25 designed to count the clock pulses *Cp* in synchronism with a vertical synchronizing signal V*sync* applied from the outside to a terminal 25 through a gate circuit 24 to be later described. The clock pulse *Cp* has a pulse width of about 0.25 H as shown in FIG. 3A, and a standard synchronizing signal having a frequency of 60 Hz of the vertical synchronizing signal V*sync* applied to the terminal 25 has a pulse width of 3 H as shown in FIG. 3B.

The first stage flip-flop FF11 in the first counter chain 22 is reversed at each decay of the clock pulses *Cp* from the reset to set position (and vice versa) and the other flip-flops FF12 to FF20 are reversed at each decay of an output of each preceding flip-flop from the reset to the set position. Therefore, the final stage of 10th flip-flop FF20 is reversed at the decay of the clock pulse *Cp* occupying the order of 512 ($=2^9$) appearing at the terminal 21 from the reset to the set position. An AND gate G1 is provided for receiving as its inputs each Q output of the first, second, fourth and tenth stage flip-flops FF11, FF13, FF14 and FF20, and all the flip-flops FF11 to FF20 in the counter chain 22 are designed to be self-reset by the output of the AND gate G1. In the arrangement, it is theoretically possible to produce a count out output having a pulse width of about $6.5\ H \approx 413\ \mu S$ (corresponding to that occupied by 13 clock pulses *Cp*) ad bearing a frequency of 60 Hz equal to that of a standard vertical synchronizing signal, each time the clock pulse *Cp* occupying the order of 525 ($= 2^9 + 2^3 + 2^2 + 2^0$) is applied to the terminal 21. Since the output of the AND gate G1 is very narrow in pulse width and thus its operation is unstable, it is practically desirable that the flip-flops FF11 to FF20 is designed to be brought into the reset position by the Q output (having a pulse width the same as that of the clock pulses) of a bistable memory (R–S flip-flop) M1 which is adapted to be brought into the set position by an output sent through an OR gate G2 from the AND gate G1 or from an external reset controller 27 to be later described, and to be brought into the reset position by the clock pulses *Cp*. In the counter chain 22, there are provided an AND gate G3 adapted to receive as inputs a predetermined combination of outputs Q and $\bar{Q}$ of the first to 10th flip-flops FF11 to FF20 and be anded at the time when, for example, the clock pulse *Cp* occupying the order of 26 ($=2^1 + 2^3 + 2^4$) is counted by the counter chain 22; and an AND gate G4 adapted to receive as inputs a predetermined combination of outputs Q and $\bar{Q}$ of the flip-flops FF11 to FF20 so as to generate an output at the time when, for example, the clock pulse $Cp$ occupying the order of 452 ($=2^2+2^6+2^8$) which defines an upper limit frequency (i.e. an inoperative period) for the circuitry 15 — in the case, about 68.3 Hz — is counted by the counter chain 22. An output of the AND gate G3 is applied to the reset terminal R of a bistable memory (R–S flip-flop) M2 having a set terminal S connected to the Q output of the 10th flip-flop FF20, to be operative so as to cause the pulse width (corresponding to that occupied by 13 clock pulses $Cp$) of a count out output of 60 Hz derived from the flip-flop FF20 to be extended up to a pulse width corresponding to that occupied by 26 pulses $Cp$ (13 H ≈ 825 μS). That is, the count out output of 60 Hz which is an output of the counter chain 22 has a pulse width of about 413 μS corresponding to that occuplied by 13 clock pulses $Cp$. The width of the count out output can be used, as a vertical synchronizing output V*out*, in the case of an ordinary deflection system, but taking into consideration the use of a vertical deflection system consisting of, for example, a pump-up type SEPP circuit, the pulse width of the count out output has been extended, as mentioned above, up to 825 μS a width two times as much. The so extended count out output V1out of the counter chain 22 is connected from the Q output of the bistable memory M2 to one input of an AND gate G5. To the other input of the AND gate G5 is connected, as will later be described, the $\bar{Q}$ output of an output switching bistable memory (R–S flip-flop) M3. The Q and $\bar{Q}$ outputs of the final stage flip-flop FF20 in the counter chain 22 are connected as inputs of a third counter chain 28 consisting of a three-stage cascade-arranged J–K flip-flops FF31 to FF33. Therefore, the Q output of the final stage flip-flop FF33 in the counter chain 28 is operative as a memory element involved during a four vertical scanning period and, together with an output of the AND gate G4, is connected via an AND gate G6 to the set terminal S of a phase coincidence bistable memory (R–S flip-flop) M4 to be later described and also to one input of each of AND gates G7 and G8. The NAD gate G7 has the other input connected to the terminal 21 to which is applied the clock pulse $Cp$ and the output of the AND gate G7 is connected through an OR gate G9 to the reset terminal R of each of the flip-flops FF31 and FF33 constituting the third counter chain 28, so that, once the AND gate G6 is anded, the flip-flops FF31 to FF33 are brought into their reset positions. The output of the AND gate G4 is, in the absence of any synchronizing signal V*sync* at the terminal 25, connected to one input of an AND gate G10 and to the input of a J–K flip-flop FF50 for unconditionally switching the vertical synchronizing output Vout to the count out output from the AND gate G5. The AND gate 10 has the other input connected to the Q output of the flip-flop FF50 and the output of the AND gate G10 is connected, together with the output of the AND gate G8, to the inputs of an OR gate G11. The outout of the OR gate G11 is connected to the reset terminal of the output switching bistable memory M3. In the second counter chain 26 are provided three AND gates G12, G13 and G14. The AND gate G12 has inputs connected to a predetermined combination of Q and $\bar{Q}$ outputs of the flip-flops FF21 to FF25 and is designed, as shown in FIG. 3E, to produce a sixth clock pulse $Cp$ applied via the gate circuit 24 to the counter chain 26. Likewise, the AND gates G13 and G14 have respective inputs connected to predetermined combinations of outputs Q and $\bar{Q}$ of the flip-flops FF21 to FF25.

The output of the AND gate G12 is connected, together with the output of the first counter chain ss i.e. the $\bar{Q}$ output of the 10th flip-flop FF20, to the inputs of an AND gate G15 constituting a first phase comparator. The output of the AND gate 15 is connected to the other input of the OR gate G9 and to the reset terminal R of the phase coincidence bistable memory M4 as well as the reset terminal R of a J–K flip-flop FF40 for effecting synchronization when the outputs of the counter chain 22 and the AND gate G12 to be later described is caused to be out of phase. The Q output of the phase coincidence bistable memory M4 is connected to one input of an AND gate G16. The output of the AND gate G16 is connected to the inputs of the flip-flop FF40 and to the other input of an AND gate G17 having one input connected to the Q output of the flip-flop FF40. The output of the AND gate G17 is connected to the set terminal S of a bistable memory (R–S flip-flop) M5 which functions as a reset controller for the output switching bistable memory M3, and to the set terminal of the output switching bistable memory M3 via an OR gate 18. The $\bar{Q}$ output of the bistable memory M5 is connected to the other input of the AND gate G8 and the Q output of the output switching bistable memory M3 is connected to one input of an AND gate G19. The output of the AND gate G12 is also connected to the reset terminal of the flip-flop FF50 and to the set terminal S of a bistable memory (R–S flip-flop) M6 operative to generate an auxiliary vertical synchronizing output V2*out* in synchronism with a vertical synchronizing signal Vsync applied to the terminal 25 from the outside. The bistable memory M6 has a reset terminal R connected to the output of the AND gate G14 and generates, from the Q output connected to the other input of the AND gate G19, the auxiliary vertical synchronizing output V2*out* having a pulse width the same as the Q output (see FIG. 3I) of the bistable memory M2, as shown in FIG. 3H.

The output of the AND gate G13 is connected to each one input of AND gates G20 and G21 in the external reset controller 27. The controller 27 further includes an OR gate having inputs connected to the outputs of the AND gate G15 and G16 and the output of the OR gate G22 is connected to the reset terminal R of a J–K flip-flop FF60. The flip-flop FF60 has its $\bar{Q}$ output connected to the other input of the AND gate G21 and a set terminal S connected to one input of an OR gate G23 in a manner to be connected in common with the output of the AND gate G21. The OR gate G23 has the other input connected to the output of the AND gate G20 and the output of the OR gate G23 is connected, together with the output of the AND gate G1, to the OR gate G2 and then to the set terminal S of the bistable memory M1.

To the second counter chain 26 is also compled an AND gate G24 having two inputs connected to the Q outputs of the first and second flip-flops F22 and FF23. Therefore, the AND gate G24 is operative to generate an output when a sixth clock pulse is applied from the terminal 21 to the counter chain i.e. immediately after the decay of the output (see FIG. 3E) of the AND gate G12. The so obtained output of the AND gate G24 is fed to the set terminal S of a bistable memory (R–S flip-flop) M7 having a noise elimination or inoperative period setting function. The bistable memory M7 has its reset terminal R connected to the output of the AND gate G4 and its Q output connected to one input of a NOR gate G25 in the gate circuit 25. The terminal 25 is connected via an inverter I1 to the other input of the NOR gate G25 and the output of the NOR gate G25 is connected to one input of an OR gate G26. The OR gate G26 has the other input connected to the Q output of the bistable memory M6. The output of the OR gate G26 is connected to one input of an AND gate G27 and through an inverter I2 to each reset terminal R of all the flip-flops FF21 to FF25 in the counter chain 26. The terminal 21 is connected via an inverter I3 to the other input of the AND gate G27. The gate circuit 24 is operative to block a supply of an external synchronizing signal V*sync* from the terminal 25 to the counter chain 26 when the Q output of the bistable memory M7 is present, and thus to block a supply of clock pulses C*p* from the terminal 21 to the counter chain 26 by the operation of the AND gate G27.

The first phase comparator consisting of the AND gate G15 is operative to compare in phase between the output P1 (See FIG. 3E) of the AND gate G12 for detecting a sixth clock pulse C*p* after a vertical synchronizing signal V*sync* is reached from the outside to the terminal 25 and the $\bar{Q}$ output P2 (see FIG. 3C: this figure shows the Q output of the flip-flop FF20 and attention is invited in the respect) of the last stage flip-flop FF20 in the first counter chain 22. In the first phase comparator G15, therefore, the count out output P2 of the first counter chain 22 is evaluated, based on the output P1 of the AND gate G12 within a range shifted or deviated in phase about 238 $\mu$S on the positive side and about 175 $\mu$S on the negative side, to be in phase. In practical application, however, a pulse width by which the count out output P2 of the first counter chain 26 is evaluated to be in phase with the output P1 of the AND gate G12 having the same pulse width (0.25 H ≈ 15.9 $\mu$S) as that of the clock pulse C*p* should be desirably determined by the deviation of the maximum possible detecting position of an output pulse P1 detected by the AND gate G12 within a pulse width variation range of the vertical synchronizing signal V*sync* applied under a weak electric field to the terminal 25. According to experiments conducted by the invention, an output pulse detected, under a weak electric field, by the AND gate G12 was found to be deviated ±1 H (≈ 63.5 $\mu$S) maximum from a normal position as shown in FIG. 3E. According to this invention, in addition to the count out output of the counter chain 22, another comparison pulse having a pulse width of about 2.5 H as shown in FIG. 3D is designed to be generated in an arrangement as shown below, taking into consideration the pulse width, 0.25 H, of the output from the AND gate G12 with a pulse width variation of ±1 H. That is, there are further provided an AND gate G28 having inputs connected to a predetermined combination of the outputs Q and $\bar{Q}$ of the first to fourth and tenth flip-flop FF11 to FF14 and FF20 in the counter chain 22 and designed to produce an output shown in shaded lines in FIG. 3J from each output of the flip-flops FF11 to FF14 as shown in FIGS. 3J to 3M; and an AND gate G29 having inputs connected to a predetermined combination of the outputs Q and $\bar{Q}$ of the third, fourth and 10th flip-flops FF13, FF14 and FF20 and adapted to generate an output shown in shaded lines in FIG. 3L. When the outputs of both the AND gates G28 and G29 are applied to a NOR gate G30 it is possible to obtain a desired comparison pulse P3 having a pulse width of 2.5 H as shown in FIG. 3D. The comparison pulse so obtained is connected together with the outputs of the AND gate G12 and the final stage flip-flop FF20 of the counter chain 22, to the inputs of an AND gate G31 constituting an second phase comparator. The output of the AND gate G31 is connected to the other input of the AND gate G16. Therefore, the AND gate G31 is operative to compare in phase between the output P1 (see FIG. 3E) of the AND gate G12 and an output pulse constituting a sum of the output of the NOR gate G30 and the output of the flip-flop FF20, said output pulse having substantially at its center the comparison pulse P3 having a pulse width T2 of 2.5 H which is the output of the NOR gate G30, at the left or negative side of the comparison pulse P3 a component having a pulse width T1 of 1.5 H which is opposite in phase to the comparison pulse P3 and at the right or positive side of the comparison pulse P3 a component having a pulse width T3 of 2.5 H which is opposite in phase to the comparison pulse P3, all of which have, as shown in FIG. 3D, a total pulse width T the same as the count out output P2 of the counter chain 22. The outputs of the AND gates G5 and G19 are connected to an output 29 for producing therefrom the vertical synchronizing output V1*out* or V2*out* of the circuitry 15 via an OR gate G23 and an inverter I3.

There will now be explained the operation of the synchronizing signal producing circuitry 15 according to this invention.

Suppose that the flip-flops FF11 to FF20, FF21 to FF25, FF31 to FF33, FF40, FF50, FF60 and bistable memories M1 to M7 in the synchronizing signal producing circuitry 15 are all set in the reset positions. When the clock pulses C*p* (see FIG. 3A) are applied to the terminal 21 simultaneously with the application of the vertical synchronizing signal V*sync* (see FIG. 3B) from the outside to the terminal 25, the flip-flops FF11 to FF20 of the first counter chain 22 count the clock pulses C*p*. At the time when a 525th clock pulse C*p* is counted, the flip-flops FF11 to FF20 are all brought into their reset positions by the output of the AND gate G1 and there is obtained as an output of the final flip-flop FF20 the count out output P2 of 60 Hz having a pulse width of about 413 $\mu$S as shown in FIG. 3C. The first counter chain 22 conducts such operation repetitively. On the other hand, the second counter chain 26 counts, by the operation of the gate circuit 24, the clock pulses C *p* applied from the terminal 21 in synchronizing with the vertical synchronizing signal V*sync* applied to the terminal 25; and, at the time when a sixth clock pulse C*p* is counted, generates the first comparison pulse P1 (the second counter chain 26 is operative to evaluate that a signal supplied from the terminal 25 is a vertical synchronizing signal only when the first comparison pulse P1 is detected) from the AND gate G12 as shown in FIG. 3E. The first comparison pulse P1 sets the bistable memory M6 in the set position and is applied to the first phase comparator G15 together with the second comparison pulse P2 opposite in porality to the first comparison pulse P1 constituting the $\bar{Q}$ output of the final stage flip-flop FF20 of the first counter chain 22. Therefore, the phase comparator G15 is operative to generate an output only when the first and second comparison pulses are out of phase. When the first and second comparison pulses are out of phase, then an output is generated from the first phase comparator G15 to cause the flip-flops FF31 to FF33, the bistable memories M3 and M5 and the flip-flop FF40 to be brought into the reset positions and, at the same time, the output switching bistable memory M3 to be brought through the OR gate G18 into the set position. As a result, both Q outputs of the output switching bistable memory M3 and the bistable memory M6 are fed to the AND gate G19 where they are anded. And a second or auxiliary vertical synchronizing output V2*out* in synchronism with the vertical synchronizing signal is produced from the terminal 29 through the OR gate G32 and inverter I3. The pulse width of the vertical synchronizing output V2*out* is determined by the bistable memory M6. That is, since the Q output of the bistable memory M6 is applied to the OR gate G26 in the gate circuit 24, the counter chain 26 continues to count the clock pulses C*p* supplied from the terminal 21 even after the vertical synchronizing signal V*sync* applied to the terminal 25 disappears, and, at the time when a 13th clock pulse C*p* (see FIG. 3F) is counted, causes all the flip-flops FF11 to FF20 in the first counter chain 22 to be brought, by the external reset controller 27, into their reset positions.

This causes the phase of a count out output from the first counter chain 22 to synchronize with the phase of the vertical synchronizing signal V*sync* applied from the outside to the terminal 25. The second counter chain 26 further continues to count the clock pulses C*p*, and, at the time when a 31st clock pulse C*p* (see FIG. 3G) is counted by the AND gate G14, causes the bistable memory M6 to be brought into the reset position. As a result, there is produced from the terminal 29 the auxiliary vertical synchronizing output V2*out*, as shown in FIG. 3H, having a pulse width of about 825 μS corresponding to the number of clock pulses C*p* (in this case, 31−6 = 25) required from the setting to the resetting of the bistable memory H6, and at the same time the second counter chain 26 stops its counting operation.

On the other hand, the flip-flops FF31 to FF33 in the thrid counter chain 28 count the count out outputs from the first counter chain 22. Though the third counter chain 28 can count four count out outputs from the first counter chain 22 which correspond to a four vertical scanning period, it stops its counting operation, halfway, once the first and second comparison pulses are out of phase; since all the flip-flops FF31 to FF33 are brought into their reset positions by the output of the first phase comparator G15.

Since in such a case the output switching bistable memory M3 is held in the set position by the output of the first phase comparator, the above-mentioned auxiliary vertical synchronizing output V2*out* continues to be generated through the AND gate G19 from the terminal 29. Furthermore during the count operation by the third counter chain 28 the auxiliary vertical synchronizing output V2*out* continues to be generated. However, when the second comparison pulse P2 is in phase with the first comparison pulse P1 over the four vertical scanning period, an output is produced from the third counter chain 28. The Q output so obtained of the final stage flip-flop FF33 in the counter chain 28 causes the bistable memory M4 to be brought into the set position through the AND gate G6, the flip-flops FF31 to FF33 to be held in their reset positions through the OR gate G9 and the output switching bistable memory M3 to be held in the reset position through the AND gates G6 and G8 and OR gate G11. Thus, the AND gate G19 is not anded and, instead, the AND gate G5 is anded by receiving as its inputs the Q̄ output of the output switching bistable memory M3 and the Q output of the bistable memory M2 adapted to be brought into the set position at the rise of the Q output of the final stage flip-flop FF20 in the first counter chain 22 and later into the reset position at the time when a 26th clock pulse C*p* is counted. As a result, instead of the auxiliary vertical synchronizing output V2*out*, a first or main vertical synchronizing output V1*out* (see FIG. 3I) in synchronism with the output of the ounter chain 22 is produced from the terminal 29.

After the output produced from the terminal 29 by the output of the third counter chain 28 is switched from the auxiliary one V1*out* to the main one V1*out*, a phase comparison is effected, by the second phase comparator G17, between the first comparison pulse P1 as shown in FIG. 3E and the third comparison pulse P3 as shown in FIG. 3D. Where the phase of the first comparison pulse P1 is present within the time period T2 in the third comparison pulse and the vertical synchronizing signal V*sync* applied to the terminal 25 is in phase with the second comparison pulse which is an output of the counter chain 22, no output is produced from the second phase comparator G17 and therefore the vertical synchronizing output V1*out* continues to be generated. However, when the phase of the first comparison pulse P1 is displaced from the time period T2 of the third comparison pulse P3 and into the time period T1 or T3, the second phase comparator G17 generates an output which in turn is applied to the AND gate G16. Since at this time the bistable memory M5 is already set in the set position, the AND gate G16 is anded. The output of the AND gate G16 causes all the flip-flops FF11 to FF20 in the counter chain 22 to be set in their reset positions through the external reset controller 27 and the phase of the count out output P3 is again synchronized with the phase of the first comparison pulse P1 or the phase of the vertical synchronizing signal (V*sync*) from the terminal 25. And the above-mentioned phase comparison is resured by the second comparator G17. When upon comparison the phase of the first comparison pulse is present in the time period T1 or T3 of the third comparison pulse, the second phase comparator G17 is again anded. This causes the bistable memory M5 through the flip-flop FF40 to be set in the set position and the AND gate G8 is not anded, resulting in disappearance of a reset pulse to be applied to the output switching bistable memory M3. At the same time, the memory M3 is set in the set position through the OR gate G18. As will be evident from the above, in place of the output V1*out* of the AND gate G5 the auxiliary vertical synchronizing output V2*out* is again produced from the terminal 29 through the AND gate G19. When a supply of the vertical synchronizing signal V*sync* to the terminal 25 is interrupted due to some causes while the auxiliary vertical synchronizing output V2*out* in synchronism with the vertical synchronizing signal applied to the terminal 25 from the outside is generated from the terminal 29, the output of the AND gate G4 causes the flip-flop FF50 to be operated. The AND gate G10 is anded by a second output from the AND gate G4 to cause the output switching bistable memory M3 to be brought into the reset position through the OR gate G11. In such no input condition, the main vertical synchronizing output V1*out* in synchronism with the output of the counter chain 22 is produced, in place of the auxiliary vertical synchronizing output, from the terminal 29. So long as the vertical synchronizing signal V*sync* is applied to the terminal 25, it will be appreciated that the above-mentioned output switching is not effected since the flip-flop FF50 is set in the reset position for each output of the AND gate G12. Thus, the synchronizing signal producing circuitry 15 according to this invention is capable of advantageously effecting a predetermined vertical scanning, either under the environment of the lower signal to noise ratio or when the vertical synchronizing signal V*sync* applied to the terminal 25 from the outside is somewhat varied in frequency, unless the clock pulse C*p* applied to the terminal 21 are interrupted.

According to this invention, the no signal time period in which there appears from the first counter chain no count out output having a frequency of 60 Hz the same as that of the standard vertical synchronizing signal, corresponds to 512 clock pulse period. Taking into consideration the frequency deviation, about ±10, of the vertical synchronizing signal, there is provided the AND gate G4 for generating an output at the time when the 452nd clock pulse C*p* is counted by the counter chain 22. The output of the AND gate G4 causes, to be set in the reset position, the bistable memory M7 brought into the set position by the output of the AND gate G24 for generating an output immediately after the detection of the first comparison pulse. The memory M7 is operative to block the supply to the counter chain 26 of any input signal appearing at the terminal 25 by its Q output, until it is set in the reset position by the output of the AND gate G4. Therefore, the synchronizing signal producing circuitry 15 according to this invention not only performs such an operation as mentioned above, but also performs the function of prevent a possible erraneous operation due to noise inputs occuring between the vertical synchronizing signals.

What is claimed is:

1. A synchronizing signal producing system for a television device comprising a first counter for receiving clock pulses having a frequency of an integral multiple of a horizontal synchronizing signal to generate an output pulse having a vertical synchronizing frequency with a larger width than that of the clock pulses; a second counter for counting the clock pulses in synchronization with the arrival of a vertical synchronizing signal from an outside; a comparison pulse generator coupled with said second counter to generate the clock pulse counted, by said second counter, at a time corresponding to substantially the center of the width of the output pulse from said first counter; a phase comparator for comparing the phase of the output pulse from said comparison pulse generator with that of the output pulse from said first counter; and an output switching means for producing as a vertical synchronizing output for the television device the output pulse of said first counter when the output pulse from said first counter and that from said comparison pulse generator are evaluated by said phase comparator to be in phase and the output pulse associated synchronously with the vertical synchronizing signal from the outside when they are evaluated by said phase comparator to be out of phase.

2. A synchronizing signal producing system as claimed in claim 1 wherein there is further provided a third counter capable of counting any number of output pulses from said first counter and being brought to a reset position by that signal from said phase comparator which represents the out-of-phase, and said output switching means is designed to deliver the output pulse from said first counter only when an output signal is derived from said third counter.

3. A synchronizing signal producing system as claimed in claim 2 wherein there is further provided another phase comparator for comparing the phase of the output pulse from said comparison pulse generator with the phase of a pulse having a smaller width than that of the output pulse from said first counter and synchronized therewith, and said output switching means is designed to deliver the output pulse from said first counter only when said another phase comarator detects an output signal indicating that both input pulses are in phase, said second-mentioned pulse having a larger width than that of the output pulse from said comparison pulse generator.

4. A synchronizing signal producing system as claimed in claim 1 further comprising a noise canceller for generating a signal indicating no output pulse period of said first counter and interrupting the supply of those noise signals applied to the system from the outside which are generated between actual vertical synchronizing signals.

5. A synchronizing signal producing system as claimed in claim 4 further comprising a circuit for delivering from said output switching means the output pulse from said first counter whenever no vertical synchronizing signal is supplied from the outside to the system, said circuit being rendered operative by an output signal from said noise canceller and inoperative by the output pulse from said comparison pulse generator.

* * * * *

UNITED STATES PATENT OFFICE
CERTIFICATE OF CORRECTION

Patent No. 3,814,855 Dated June 4, 1974

Inventor(s) Naoyuki KOKADO

It is certified that error appears in the above-identified patent and that said Letters Patent are hereby corrected as shown below:

On initial page of patent under the heading of "[73] Assignee:" change "Saivai-ku" to --Saiwai-ku--;

Delete foreign application priority data;

Column 12, line 32, change "comarator" to --comparator--.

Signed and sealed this 17th day of December 1974.

(SEAL)
Attest:

McCOY M. GIBSON JR.
Attesting Officer

C. MARSHALL DANN
Commissioner of Patents